United States Patent [19]

Tuch et al.

[11] Patent Number: 5,040,175
[45] Date of Patent: Aug. 13, 1991

[54] WIRELESS INFORMATION TRANSMISSION SYSTEM

[75] Inventors: Bruce T. Tuch, Ce De Bilt, Netherlands; Michael A. Masleid, Dyer, Ind.

[73] Assignees: NCR Corporation, Dayton, Ohio; Inland Steel Company, Chicago, Ill.

[21] Appl. No.: 507,558

[22] Filed: Apr. 11, 1990

[51] Int. Cl.$^5$ .............................................. H04J 3/02
[52] U.S. Cl. .................................. 370/85.2; 370/85.3; 370/94.2; 370/94.1; 371/34
[58] Field of Search ................. 340/825.5; 371/34, 33, 371/32; 370/85.2, 85.3, 94.1, 94.2

[56] References Cited

U.S. PATENT DOCUMENTS

| | | | |
|---|---|---|---|
| 4,271,513 | 6/1981 | Maejima et al. | 371/34 |
| 4,347,609 | 8/1982 | Fukuyama et al. | 371/34 |
| 4,573,154 | 2/1986 | Nakata et al. | 371/34 |
| 4,725,834 | 2/1988 | Chang et al. | 370/85.4 |
| 4,755,990 | 7/1988 | Bohler et al. | 340/825.5 |
| 4,789,983 | 12/1988 | Acampora et al. | 370/96 |
| 4,839,892 | 6/1989 | Sasaki | 370/95.1 |
| 4,872,205 | 10/1989 | Smith | 340/825.5 |

FOREIGN PATENT DOCUMENTS

| | | |
|---|---|---|
| 0184383 | 11/1985 | European Pat. Off. . |
| 0286614 | 3/1988 | European Pat. Off. . |
| 0294133 | 5/1988 | European Pat. Off. . |
| 2206468 | 6/1988 | European Pat. Off. . |

*Primary Examiner*—Douglas W. Olms
*Assistant Examiner*—Dang Ton
*Attorney, Agent, or Firm*—Wilbert Hawk, Jr.; Stephen F. Jewett; Albert L. Sessler, Jr.

[57] ABSTRACT

A wireless local area network (10) includes a plurality of stations (12) adapted to transmit and receive message packets via a distribution system (30). In a time division multiplexing embodiment the network (10) operates using successive timing frames (FR1, FR2, etc.) each consisting of three timing intervals (T1, T2, T3). During the first timing interval (T1) the distribution system (30) normally transmits synchronizing packets (HBT), to which a station (12) desiring to transmit responds by transmitting an information packet during the next second timing interval (T2). During the subsequent first timing interval (T1), the distribution system (30) retransmits the received information packet. Any transmitting station (12) which detects an information packet mismatch transmits a collision reporting code (CDT) during the next third timing interval (T3) to which the distribution system (30) responds by transmitting a collision acknowledgement code (CAKT) to all the stations (12) thereby aborting information transmission. A frequency division multiplexing embodiment is also disclosed.

9 Claims, 7 Drawing Sheets

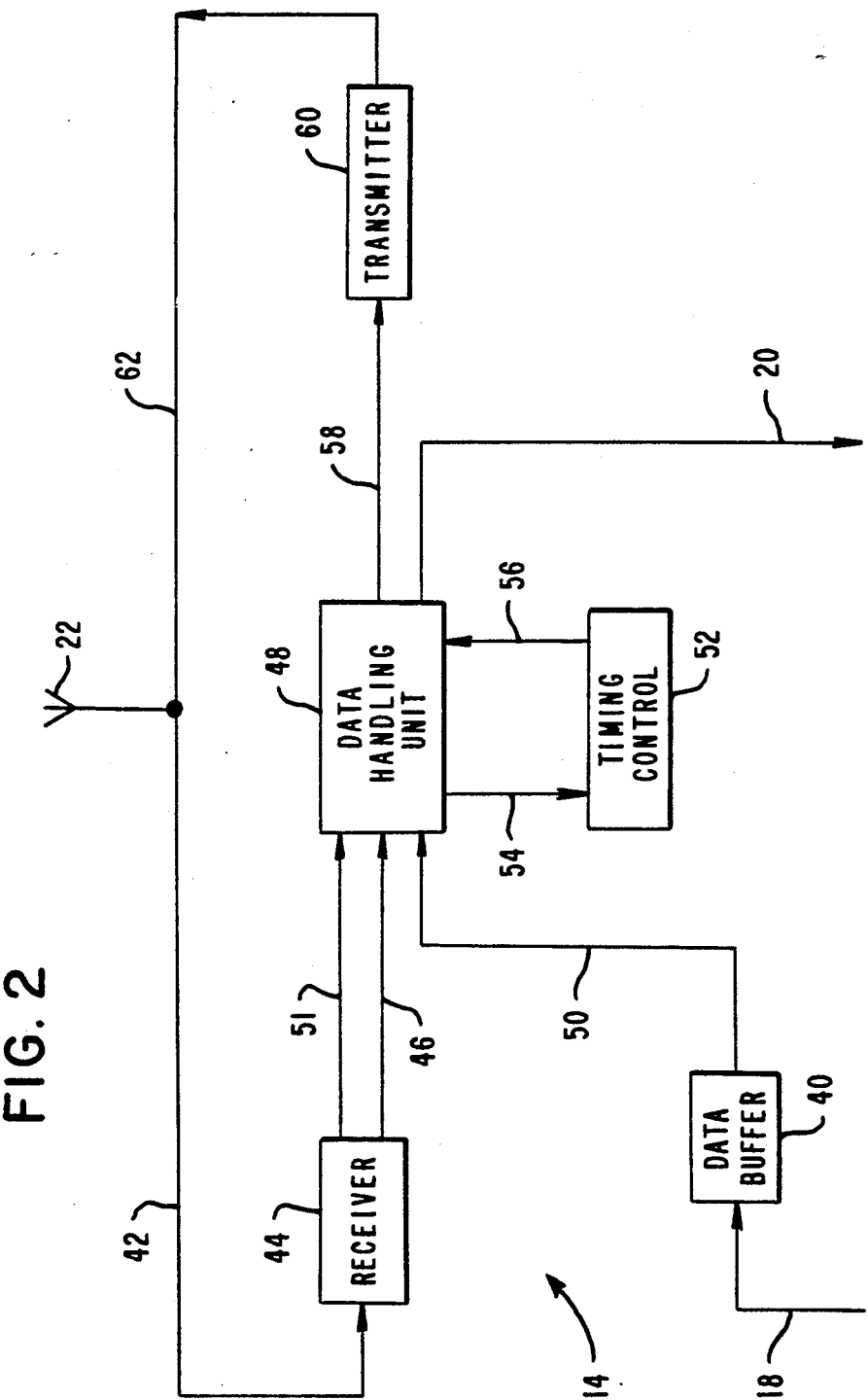

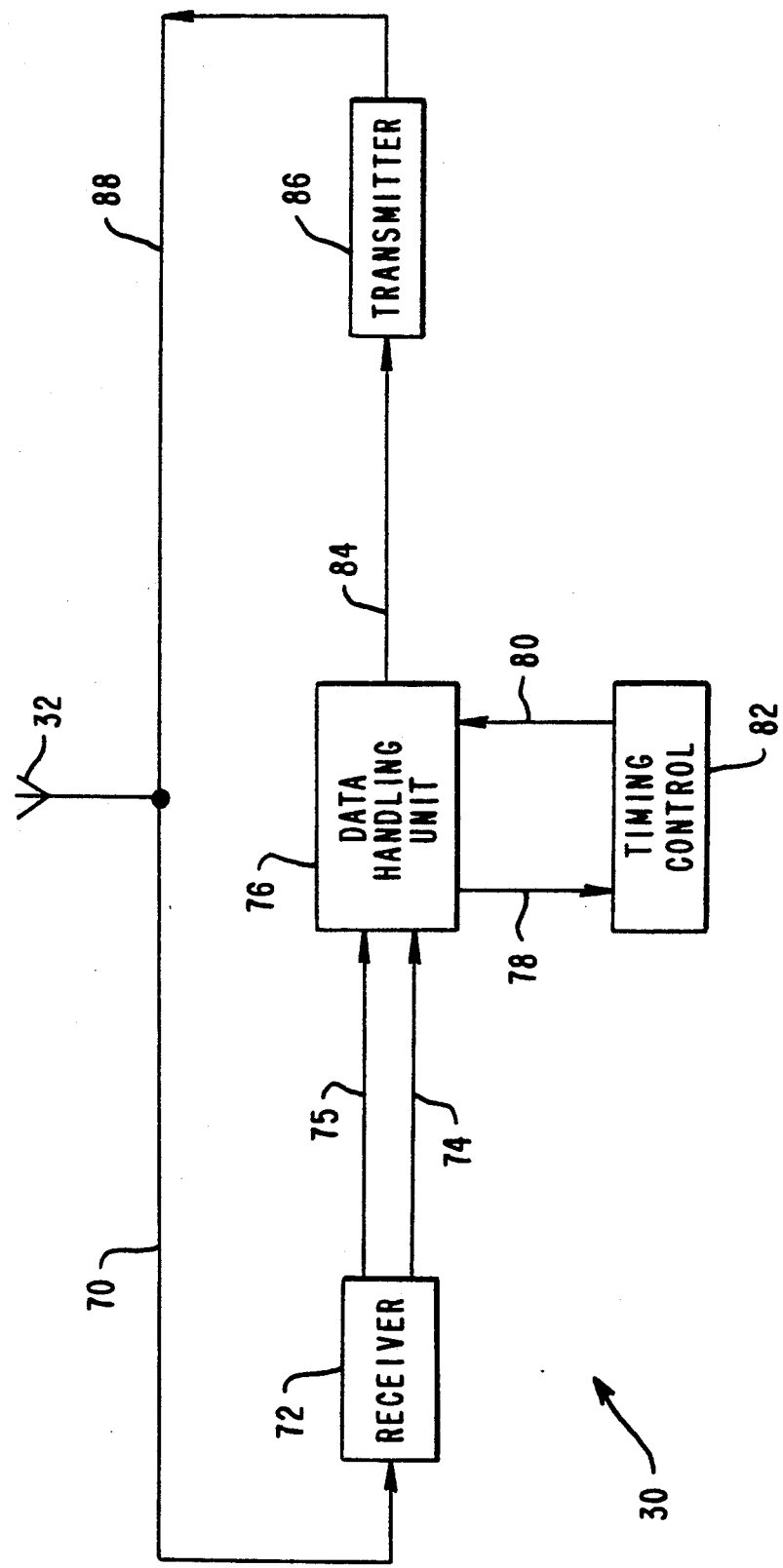

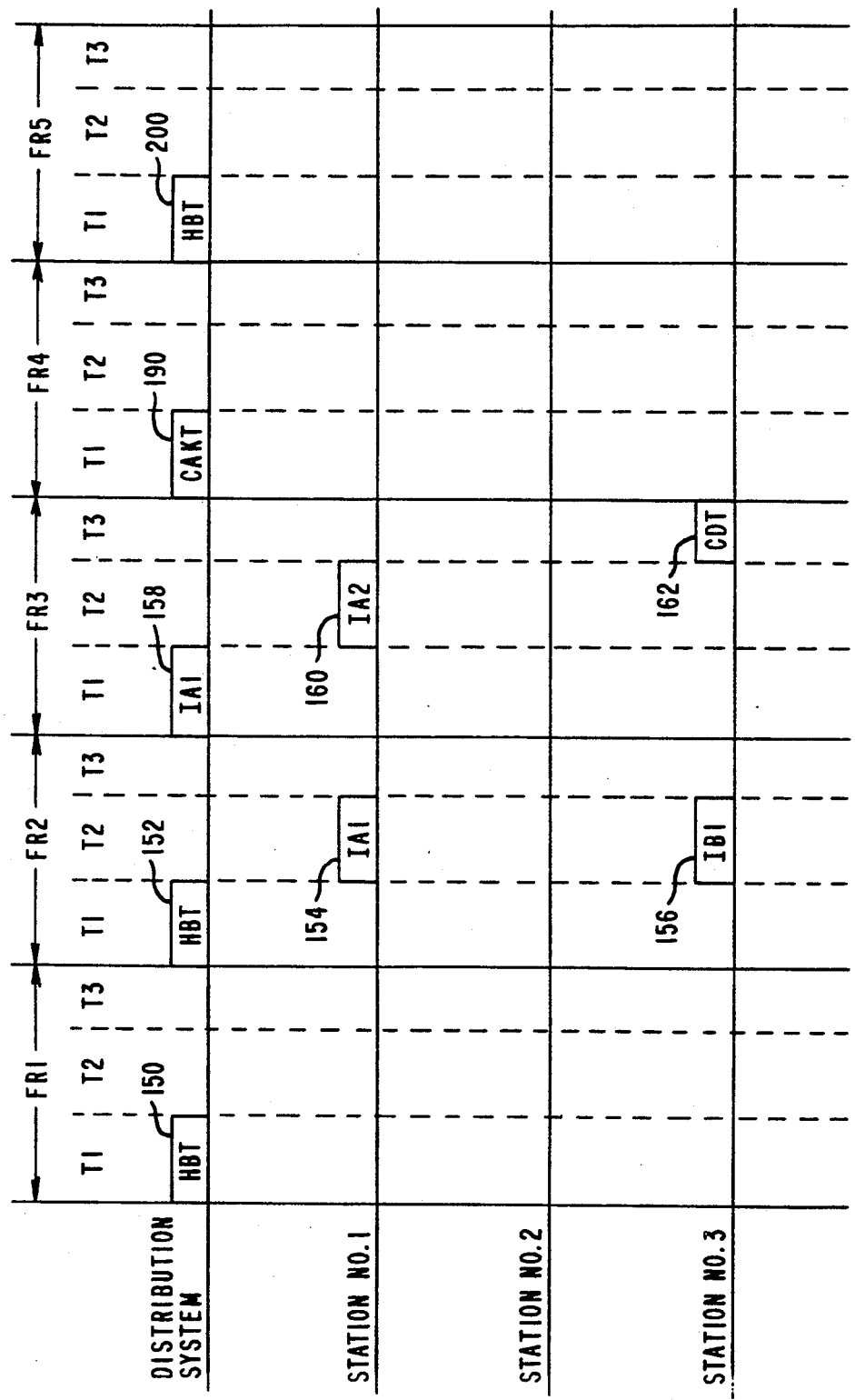

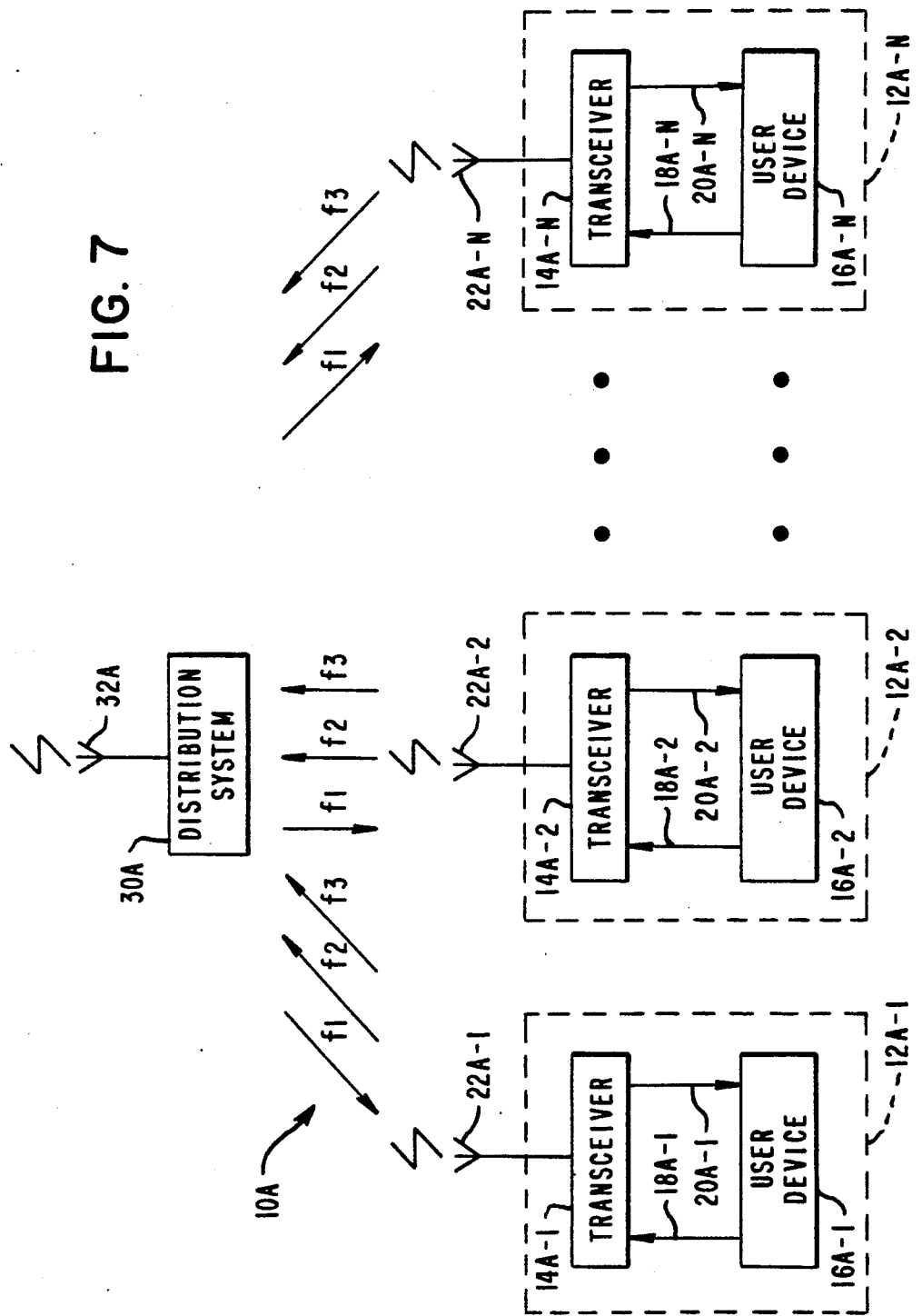

WIRELESS INFORMATION TRANSMISSION SYSTEM

BACKGROUND OF THE INVENTION

This invention relates to a method of transmitting information between a plurality of stations in a local area network.

Various methods are known for sharing network communication channels among stations in a local area network (LAN). One widely used method is known as CSMA/CD, (carrier sense multiple access/collision detect). According to this known method, a station wishing to transmit a message listens until the transmission channel is idle before commencing to transmit an information packet. Furthermore, the station continues to listen to the channel after commencing a transmission and if a collision is detected, that is, more than one station has commenced to transmit an information packet, any station which detects such collision terminates its message transmission and transmits a burst of noise (or garble) such that all other stations can be informed of the collision, terminate message transmission, and wait a random time before attempting to commence a further message transmission.

From Patent Abstracts of Japan volume E-690, page 102, abstract of Japanese Published Application No. 63-187746, there is known a wireless communication system wherein a plurality of stations communicate via a repeater installation. A first frequency is used for transmission from the stations to the repeater installation and a second frequency is used for transmissions from the repeater installation to the stations. If the repeater installation detects a collision on the first frequency transmissions, then it immediately informs all stations of such collision using the second frequency, such that the stations can take appropriate action.

Although the CSMA/CD method has proved satisfactory for transmissions over a cable physical medium, it has been found that a problem arises if it is attempted to apply the method to wireless radio transmissions in that small radio signals may be totally masked by larger signals during reception. This phenomenon is known as the "capture effect", and may prevent the detection of collisions in a system such as that disclosed in the aforementioned Japanese patent abstract.

SUMMARY OF THE INVENTION

It is an object of the present invention to provide a method of transmitting information between a plurality of stations in a local area network, which alleviates the problem of collision detection when a wireless radio communication medium is utilized.

Therefore, according to the present invention, there is provided a method of transmitting information between a plurality of stations in a local area network, comprising the following steps:

(a) providing a distribution system;

(b) defining first, second and third transmission channels;

(c) defining a transmission-enabling condition using said first transmission channel;

(d) transmitting from a station which has a message to transmit, an information packet over said second transmission channel in response to a transmission-enabling condition;

(e) receiving a transmitted information packet at said distribution system;

(f) retransmitting the received information packet from said distribution system over said first transmission channel;

(g) comparing at any station which has transmitted, the received retransmitted information packet with the information packet originally transmitted by that station;

(h) in the event of a comparison match, transmitting a further information packet over said second transmission channel;

(i) in the event of a comparison mismatch, transmitting a collision reporting packet from such station over said third transmission channel;

(j) receiving a transmitted collision reporting packet at said distribution system;

(k) transmitting a collision acknowledgement condition, in lieu of the information received over the second transmission channel, from said distribution system over said first transmission channel;

(l) terminating message transmission at all stations which are transmitting, in response to said collision acknowledgement condition; and (m) returning to step (c).

It will be appreciated that by utilizing a method according to the invention, each station, by virtue of the comparison step, can detect that its own transmission is invalid, that is, not received at the distribution system. Also, any station which has "captured" the transmission channel can be informed, by means of the collision acknowledgement condition that its transmitted packet has collided with the transmitted packet of another station.

BRIEF DESCRIPTION OF THE DRAWINGS

Two embodiments of the present invention will now be described by way of example, with reference to the accompanying drawings, in which:

FIG. 2 is a block diagram of a typical station;

FIG. 3 is a block diagram of the distribution system;

FIG. 6 is a timing diagram of the operation of the network when a collision occurs;

FIG. 7 is a block diagram of a wireless radio local area network operating according to a frequency division multiplexing scheme.

DETAILED DESCRIPTION

Figure 1:
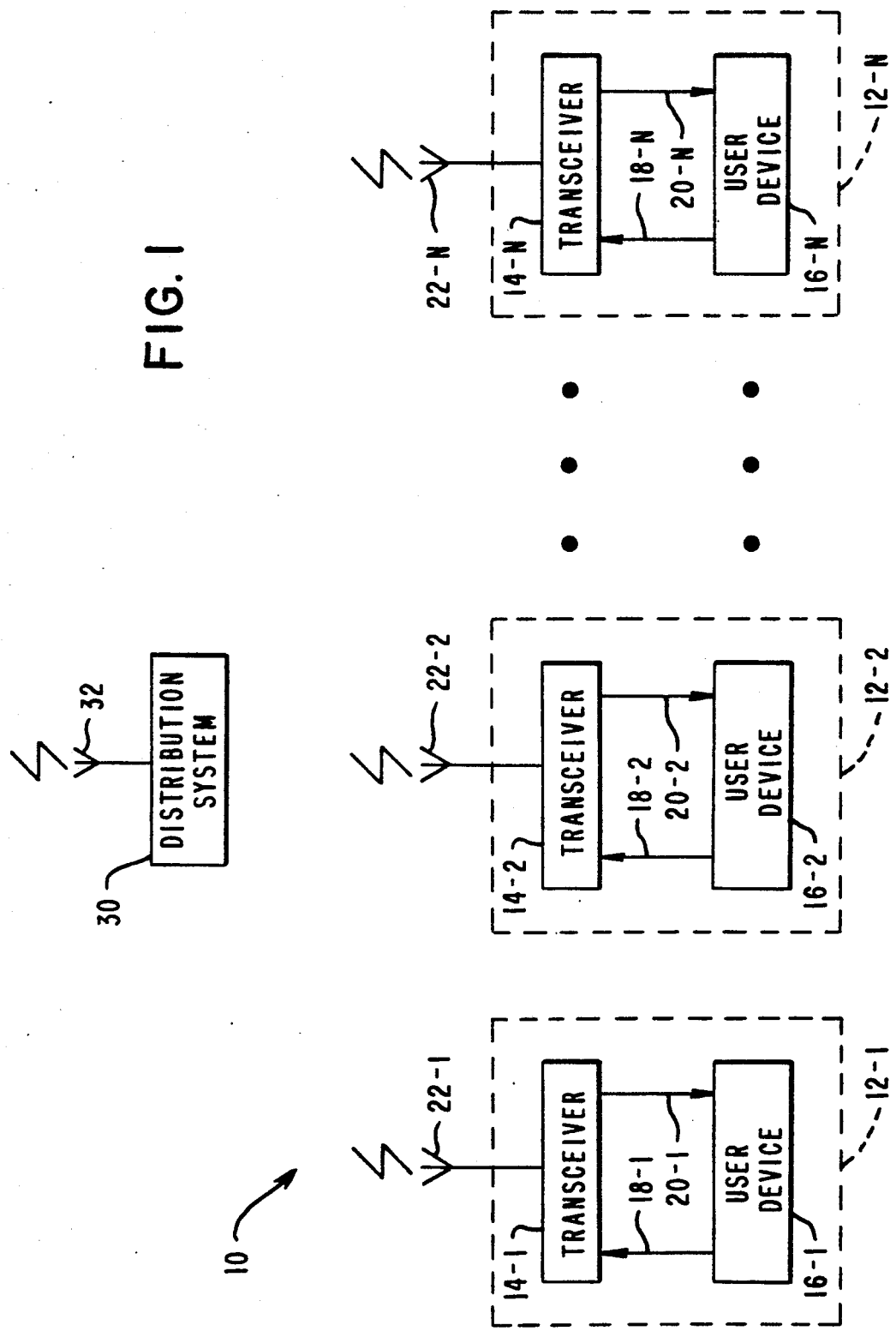
FIG. 1 shows a local area network using wireless radio communication and including a plurality of stations and a central distribution system, operating according to a time division multiplexing scheme.

Referring first to the time division multiplexing embodiment shown in FIG. 1, there is shown a wireless information local area network (LAN) 10, which uses three transmission channels defined by timing intervals T1, T2, T3, to be explained hereinafter.

The network 10 includes a plurality of stations 12, identified individually as stations 12-1, 12-2, ..., 12-N, among which information is to be transmitted. Each station 12 includes a transceiver 14 and a user device 16, identified individually as transceivers 14-1, 14-2, ..., 14-N and user devices 16-1, 16-2, ..., 16-N, respectively.

The user devices 16 are coupled to the respective transceivers 14 by output and input lines 18, 20 identified individually as output lines 18-1, 18-2, ..., 18-N and input lines 20-1, 20-2, ..., 20-N.

The transceivers transmit and receive radio frequency (RF) signals via antennas 22, identified individually as antennas 22-1, 22-2, ..., 22-N. The stations 12 may be for example personal computers, printers, data terminals or data handling devices.

The network 10 also includes a distribution system 30 which has an antenna 32, and is adapted to receive messages transmitted from a transmitting station 12 and retransmit the received messages such that the messages are received by all the stations 12 including, of course, the station to which the messages are addressed. All transmissions take place over the same frequency channel.

Referring now to FIG. 2 there is shown a block diagram of a typical station transceiver 14, which can be any one of transceivers 14-1, 14-2, ..., 14-N shown in FIG. 1. The transceiver 14 includes a data buffer 40 which receives input data to be transmitted, from the associated user device 16 (FIG. 1). The transceiver antenna 22 is coupled via line 42 to an RF receiver 44 which provides demodulated data on an output line 46 connected to a data handling unit 48, which also receives an input over a line 50 from the data buffer 40. The receiver 44 also provides a carrier detect signal on a line 51 in response to detection of a carrier signal. The data handling unit 48 is coupled via lines 54 and 56 to a timing control circuit 52. The data handling unit 48 provides decoding, buffer storage and comparison capabilities as will be discussed hereinafter. The timing control circuit 52 controls the timing operations of the data handling unit 48. The data handling unit 48 has an output line 58 connected to an RF transmitter 60 which modulates the applied data and is coupled over a line 62 to the antenna 22. The data handling unit 48 also has an output connected to the line 20 which is coupled to the associated user device 16.

Referring now to FIG. 3, there is shown a block diagram of the distribution system 30. The antenna 32 is connected over a line 70 to an RF receiver 72 which demodulates the received signals, and has a data output line 74 and a carrier detect output line 75, both coupled to a data handling unit 76 which is coupled via lines 78 and 80 to a timing control circuit 82. The data handling unit 76 provides decoding and buffer storage capabilities as will be discussed hereinafter. The timing control circuit 82 includes timer devices for defining the timing intervals T1, T2, T3, discussed subsequently. The data handling unit 76 has an output line 84 coupled to an RF transmitter 86 which modulates the applied data and is coupled over a line 88 to the antenna 32.

Figure 4A:
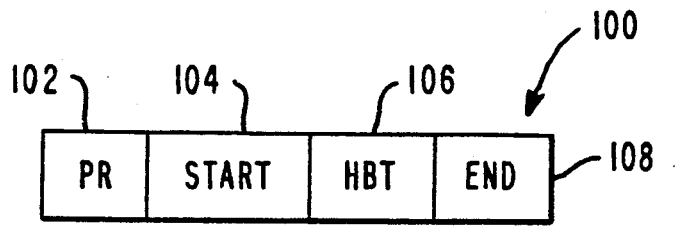
FIGS. 4A to 4D inclusive are diagrams showing the format of message packets which are transmitted over the network.

Information is transmitted in the network 10 in the form of packets. The network is synchronized under the control of synchronizing packets, referred to as heartbeat packets HBT, which are transmitted by the distribution system 30 at regular intervals defining first timing intervals T1, of successive timing frames FR1, FR2, etc. The heartbeat packets HBT are received by all the stations 12 and are recognized as heartbeat packets HBT by decoders (not shown) in the respective data handling units 48 in the stations 12. Referring to FIG. 4A, there is shown the format of a heartbeat packet 100 transmitted on the network 10. The heartbeat packet 100 includes a preamble (PR) portion 102, a start delimiter portion 104, and identification code (HBT) portion 106, and an end delimiter portion 108. As is well known in the art, the preamble portion 102 permits the receivers 44 (FIG. 2) to adjust the control variables, such as gain and to ensure bit synchronization.

Figure 4B:
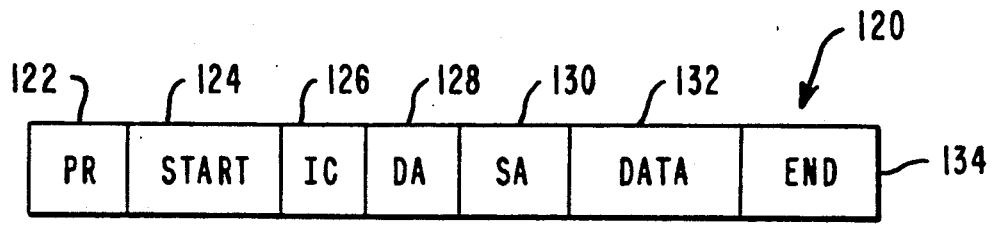
Figure 5:
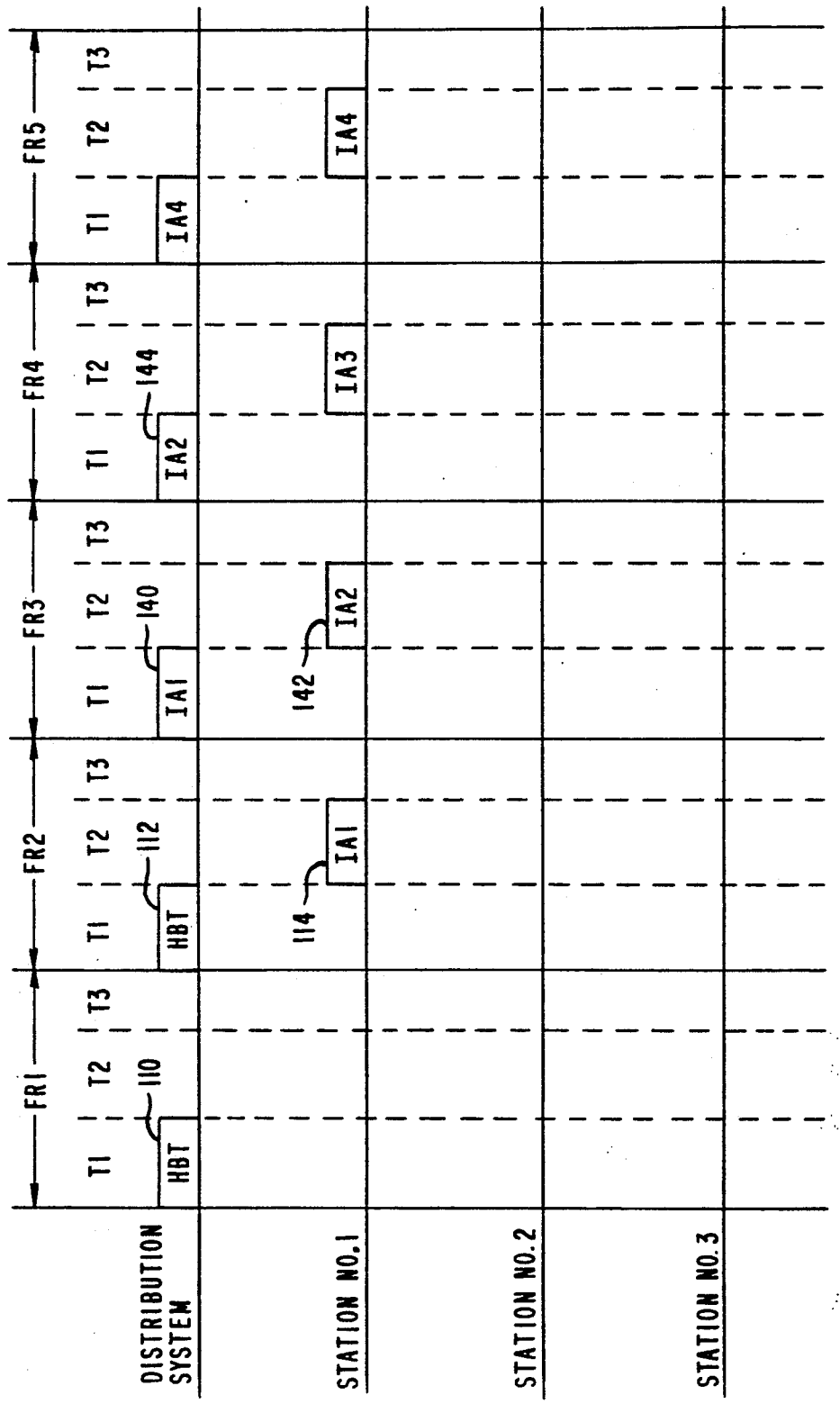
FIG. 5 is a timing diagram of the operation of the network when no collision occurs.

Referring now to FIG. 5, there is shown a timing diagram for the operation of the network 10 when no collisions occur. In the first timing interval T1 of the first timing frame FR1, an HBT packet 110 is transmitted by the distribution system 30 and received by all the stations 12. Since it is assumed that at this time, no station 12 desires to transmit information, the remaining timing intervals T2 and T3 of the first timing frame do not contain any transmissions. In the next timing frame FR2, a further HBT packet 112 is transmitted. It is assumed that station No. 1 desires to transmit a message at this time. Consequently, after recognition of the end delimiter portion of the HBT packet the timing control unit 52 (FIG. 2) in station No. 1 causes the data handling unit 48 to transmit a first message portion from the data buffer 40, formatted into an information packet (IA1) 114. Referring briefly to FIG. 4B, there is shown the format of a typical information packet 120. The information packet contains a preamble portion 122, a start delimiter portion 124, an identification code (IC) portion 126, and an end delimiter portion 134. The destination address (DA) portion 128, the source address (SA) portion 130 and the data portion 132 are directly taken from the message delivered by the user device 16 over the output line 18. The illustrated format in FIG. 4B is only applicable to the first packet of a message. All subsequent packets of the message contain a data portion but no address portions.

Returning now to FIG. 5, the information packet 114, transmitted by station No. 1 during time interval T2 of timing frame FR2 is received by the distribution system 30 and temporarily stored in a buffer (not shown) included in the data handling unit 76. During the first timing interval T1 of the timing frame FR3 an information packet (IA1) 140, containing the information just received, is transmitted by the distribution system 30 instead of a heartbeat packet. All the stations 12 recognize the packet as an information packet, by decoding of the identification code portion thereof in the data handling units 48 of the stations, and maintain timing frame synchronization with the information packet 140, in the same manner as with a heartbeat packet HBT.

However, no station 12 may commence a message transmission in response to receiving an information packet, as opposed to a heartbeat packet. Thus, during timing interval T2 of timing frame FR3, only the already transmitting station No. 1, may transmit. The data handling units 48 in the other stations no longer see a transmission enabling condition and are consequently inhibited from commencing a message transmission during timing interval T2 of timing frame FR3.

Thus, during the next timing interval T2 of the timing frame FR3, the transmitting station No. 1 transmits a further portion of its message in the form of an information packet (IA2) 142. This information packet (IA2) is then retransmitted as packet 144 during the first timing interval T1 of timing frame FR4. This procedure continues, as indicated by packets IA3, IA4 in FIG. 5 until the entire message has been transmitted by station No. 1 and received by its destination station whereafter the distribution system 30 again transmits heartbeat (HBT) packets to maintain network synchronization.

The above described operation assumes that only one station 12, station No. 1 in the particular example, attempts to transmit during the timing interval T2 of timing frame FR2. The operation will now be considered where more than one station transmits during such timing interval. Referring to FIG. 6, it is assumed that during the first timing interval T1 of timing frame FR1 a heartbeat packet (HBT) 150 is transmitted by the distribution system 30 but that none of the stations 12 desires to transmit information at this time. Consequently, no information is transmitted during timing interval T2 of timing frame FR1. During timing interval T1 of timing frame FR2, another heartbeat packet 152 is transmitted by the distribution system 30, and received by all the stations 12. It is now assumed that (at least) two stations 12, identified in FIG. 6 as station No. 1 and station No. 3, desire to transmit information. Consequently, during timing interval T2 of timing frame FR2, station No. 1 transmits an information packet (IA1) 154 and station No. 3 transmits an information packet (IB1) 156.

During timing interval T2 of timing frame FR2, there are two possible reception conditions at the distribution system 30. The first reception condition is that, due to the aforementioned "capture" effect, the signals of one of the transmitted information packets are totally masked by the signals of the other information packet. For example, assume that the information packet (IA1) 154 transmitted by station No. 1 is received by the distribution system 30 and totally masks the information packet (IB1) 156 transmitted by station No. 3. Thus, the information packet 156 is not received by the data handling unit 76 of the distribution system 30. The distribution system 30 therefore transmits, during timing interval T1 of timing frame FR3, the information packet IA1, as shown by reference 158. As described with reference to FIG. 5, the information packet IA1 is received by all the stations 12. Furthermore, the data handling units 48 of the transmitting stations No. 1 and No. 3 compare the received information packet 158 with the transmitted information packets 154 and 156 which are stored in a buffer register (not shown) in the respective data handling unit 48. The comparison at the transmitting station No. 1 results in a match, since the information packets 154 and 158 are identical. Station No. 1 transmits a further information packet (IA2) 160 during timing interval T2 of timing frame FR3. However, the comparison at the transmitting station No. 3 results in a mismatch, since at least the source address portions of the information packets IA1 and IB1 are different i.e. station No. 3 does not recognize its address as the source address in the received information packet IA1. This mismatch serves as a local "collision detect" i.e. simultaneous transmissions by two stations 12 are detected by station No. 3. In response to the comparison mismatch, the data handling unit 48 of station No. 3 transmits a collision reporting packet (CDT) 162 during timing interval T3 of timing frame FR3, and reports a detected collision to the user device 16 of station No. 3 over the line 20. A random timer (not shown) included in the user device 16 of station No. 3 is triggered, and a retry is initiated when the random timer times out.

Figure 4C:
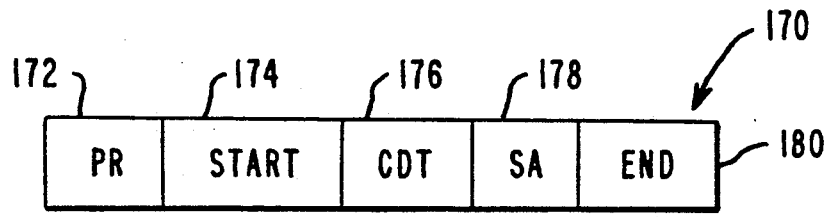

Referring briefly to FIG. 4C, there is shown the format of a collision reporting packet 170. The collision reporting packet 170 includes a preamble portion 172, a start delimiter position 174, a collision detect (CDT) portion 176, a source address portion (SA) 178, containing the address of the station which detected the mismatch, and an end delimiter portion 180. The inclusion of the source address portion (SA) 178 in the collision reporting packet 170 has the advantage that, if two or more stations are reporting collisions, total signal cancellation is not possible, since the packets are not identical. In an alternative arrangement, instead of the source address in the portion 178, the collision reporting packet could contain a scrambled version of the station address, obtained for example by subjecting the station address to an encryption algorithm such as a randomly seeded scrambling polynomial, whereby long length station addresses may be replaced by changing shorter length encrypted codes. In yet another alternative arrangement, the collision reporting packet is limited to just the source address. The transmission of such a signal is sufficient to cause the provision of a carrier detect signal on the line 75 in the distribution system 30.

Returning now to FIG. 6, the collision reporting packet (CDT) 162 transmitted by station No. 3 during timing interval T3 of timing frame FR3 is received by the distribution system 30. The receipt of a collision reporting packet is identified by a decoding operation within the data handling unit 76 which is then caused to transmit during the timing interval T1 of the next timing frame FR4, a collision acknowledgement packet (CAKT) 190, instead of a heartbeat packet or a retransmitted information packet.

It should further be noted that if two or more stations report collisions and transmit collision reporting packets, total signal cancellation is not possible and some signal modulation will therefore be received by the distribution system 30 during timing interval T3 of timing frame FR3, and detected by a carrier detect signal provided on the line 75 (FIG. 3). Accordingly, the distribution system 30 is further arranged to respond to the receipt of such carrier detect signal during such timing interval, to transmit a collision acknowledgement packet (CAKT).

Figure 4D:
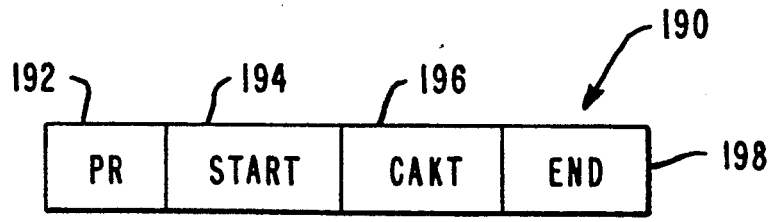

Referring briefly to FIG. 4D, the collision acknowledgement packet 190 is shown as including a preamble portion 192, a start delimiter portion 194, a collision acknowledgement code (CAKT) portion 196 and an end delimiter portion 198.

The receipt by the stations 12 of the collision acknowledgement packet 190 informs all user devices 16 over line 20 that a collision has occurred. Stations 1 and 3 then terminate message transmission, and by means of a random timer included in the user device 16 cause a transmission retry at a later random time.

In the first timing interval T1 of the next timing frame FR5, a heartbeat packet (HBT) 200 is transmitted by the distribution system 30, thereby returning the network 10 to a condition when any station 12 can commence to transmit a message, in the manner described hereinabove.

The second reception condition at the distribution system 30, during timing interval T2 of timing frame FR2, is that the capture effect is not effective, for example if approximately equal strength signals are received from two transmitting stations. This condition may be detected at the distribution system 30 for example by detecting that a timer set at the commencement of timing interval T2 has expired without an end of transmission code (134 in FIG. 4B) having been detected. Alternatively, clock samples recovered at the distribution system 30 from the received data may be monitored and irregularities in such monitored clock signals used to provide a signal indicating that such clock signals must have come from more than one station. Whatever detecting procedure is used, if the distribution system 30 fails to detect a valid information packet, in other words, if an indecipherable information packet is detected, the distribution system responds by transmitting a collision acknowledgement packet (FIG. 4D) during the next timing interval T1.

There will now be briefly described a second embodiment of the invention, employing frequency division multiplexing. Referring to FIG. 7, there is shown a local area network 10A employing a frequency division multiplexed mode using three transmission channels identified by transmission frequencies $f_1$, $f_2$ and $f_3$. The network 10A includes a distribution system 30A and stations 12A, identified individually as 12A-1 to 12A-N. In FIG. 7, circuit components corresponding to those in the network 10 of FIG. 1 are identified by identical reference numbers with an A suffix.

The frequency $f_1$ is used for transmission from the distribution system 30A. The frequencies $f_2$ and $f_3$ are used for transmissions from the stations 12A.

The operation of the network 10A will now be briefly described. A station 12A desiring to transmit a message, upon detecting silence (absence of a carrier signal) on the $f_1$ channel, sends an information packet on the $f_2$ channel. The distribution system 30A retransmits the received information packet on the $f_1$ channel. The stations 12A compare the information packet received on the $f_1$ channel with the information packet, if any, which they transmitted on the $f_2$ channel. In the case of a mismatch, a collision reporting packet is transmitted on the $f_3$ channel by any station 12A which detects such a mismatch.

In response to a collision reporting packet being received, the distribution system 30A responds by transmitting a collision acknowledge condition on the $f_1$ channel.

Furthermore, if the distribution system 30A does not "capture" the transmission of a particular transmitting station 12A, it may itself detect a collision, as explained in connection with the first embodiment, and respond by transmitting collision acknowledgement condition on the $f_1$ channel immediately. In this manner all stations on the $f_2$ channel will explicitly detect the collision.

It will be appreciated that the described networks 10 and 10A have the advantage that even though a transmitting station 12 or 12A captures the transmission channel, collision with another transmitting station 12 or 12A can be reliably reported, and message transmission aborted for a subsequent retry.

While the forms of the invention shown and described herein are admirably adapted to fulfill the object primarily stated, it is to be understood that it is not intended to confine the invention to the forms or embodiments disclosed herein, for it is susceptible of embodiment in various other forms within the scope of the appended claims.

What is claimed is:

1. A method of transmitting information packets between a plurality of stations in a wireless local area network, comprising the following steps:
    (a) providing a plurality of local area network stations;
    (b) providing a distribution system for receiving packets transmitted by all said local area network stations and for transmitting packets to all said local area network stations;
    (c) defining first, second and third wireless transmission channels, said first wireless transmission channel for transmitting packets from said distribution system to said local area network stations, and said second and third wireless transmission channels for transmitting packets from said local area network stations to said distribution system;
    (d) defining a transmission-enabling condition using said first wireless transmission channel;
    (e) transmitting from a local area network station which has a message to transmit, an information packet over said second wireless transmission channel in response to a transmission-enabling condition;
    (f) receiving a transmitted information packet at said distribution system;
    (g) retransmitting the received information packet from aid distribution system over said first wireless transmission channel;
    (h) comparing at any local area network station which has transmitted, the received retransmitted information packet with the information packet originally transmitted by that local area network station;
    (i) in the event of a comparison match, transmitting a further information packet over said second wireless transmission channel;
    (j) in the event of a comparison mismatch, transmitting a collision reporting packet from such local area network station over said third wireless transmission channel;
    (k) receiving a transmitted collision reporting packet at said distribution system;
    (l) transmitting a collision acknowledgment condition, in lieu of the information received over the second transmission channel, from said distribution system over said first wireless transmission channel;
    (m) terminating message transmission at all local area network stations which are transmitting, in response to said collision acknowledgment condition; and
    (n) returning to step (d).

2. A method according to claim 1, in which said first, second and third wireless transmission channels are formed by first, second and third timing intervals in repetitive timing frames; in which said defining step (d) includes the step of: transmitting from said distribution system during said first timing intervals, synchronizing packets and receiving said synchronizing packets at said local area network stations; and in which said transmitting step includes transmitting an information packet during one of said second timing intervals, in response to receipt of one of said synchronizing packets.

3. A method according to claim 2, in which said retransmitting step (g) includes the step of retransmitting the received information packet from said distribution system during the next first timing interval instead of synchronizing packet.

4. A method according to claim 3, in which said terminating step (m) includes the steps of detecting at said distribution system whether a transmission signal is present during said third timing intervals; in response to the detection of a transmission signal during a third timing interval, transmitting a collision acknowledgment code during the next first timing interval instead of a synchronizing packet; and terminating message transmission from all transmitting stations in response to receipt of said collision acknowledgement code.

5. A method according to claim 1, in which said collision reporting packet includes a representation of the address of the local area network station transmitting said collision reporting packet.

6. A method according to claim 5, in which said representation is a scrambled version of the station address.

7. A method according to claim 4, in which in said step (f), if an indecipherable information packet is received, said distribution system responds by transmitting said collision acknowledgement code during the next first timing interval.

8. A method according to claim 1, in which said first, second and third wireless transmission channels are formed by first, second and third transmission frequencies; in which said defining step (c) includes detecting the absence of a carrier signal on said first wireless transmission channel; and in which said collision reporting packet causes said distribution system to transmit a collision acknowledgement condition over said first wireless transmission channel.

9. A method according to claim 8, in which in said step (f), if indecipherable information is received, said distribution system responds by transmitting said collision acknowledgement code over said first wireless transmission channel.

* * * * *

UNITED STATES PATENT AND TRADEMARK OFFICE
CERTIFICATE OF CORRECTION

PATENT NO. : 5,040,175
DATED : August 13, 1991
INVENTOR(S) : Bruce T. Tuch et al.

It is certified that error appears in the above-identified patent and that said Letters Patent is hereby corrected as shown below:

Column 8, line 16, delete "aid" and substitute --said--.

Signed and Sealed this

Fifth Day of January, 1993

*Attest:*

DOUGLAS B. COMER

*Attesting Officer*  *Acting Commissioner of Patents and Trademarks*